(12) United States Patent
Jiang (10) Patent No.: US 12,520,366 B2
(45) Date of Patent: Jan. 6, 2026

(54) DATA TRANSMISSION METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 307 days.

(21) Appl. No.: 18/260,804

(22) PCT Filed: Jan. 13, 2021

(86) PCT No.: PCT/CN2021/071612
§ 371 (c)(1),
(2) Date: Jul. 10, 2023

(87) PCT Pub. No.: WO2022/151106
PCT Pub. Date: Jul. 21, 2022

(65) Prior Publication Data
US 2024/0064841 A1    Feb. 22, 2024

(51) Int. Cl.
*H04W 76/00* (2018.01)
*H04W 12/106* (2021.01)
*H04W 28/06* (2009.01)
*H04W 76/19* (2018.01)

(52) U.S. Cl.
CPC ......... *H04W 76/19* (2018.02); *H04W 12/106* (2021.01); *H04W 28/065* (2013.01)

(58) Field of Classification Search
CPC .. H04W 76/19; H04W 12/106; H04W 28/065
See application file for complete search history.

(56) References Cited

U.S. PATENT DOCUMENTS

| | | | |
|---|---|---|---|
| 2019/0335364 A1 | 10/2019 | Liu et al. | |
| 2020/0068652 A1* | 2/2020 | Xu | H04L 1/1896 |
| 2020/0196189 A1* | 6/2020 | Jo | H04W 76/19 |

FOREIGN PATENT DOCUMENTS

| | | | | |
|---|---|---|---|---|
| CN | 113543040 A | * | 10/2021 | ............ H04L 65/611 |
| EP | 3609106 A1 | | 2/2020 | |
| JP | 2019532528 A | | 11/2019 | |
| WO | WO 2019/031751 A1 | | 2/2019 | |

OTHER PUBLICATIONS

Search Report for EP Application No. 21918321.7, dated Jan. 30, 2024, 12 pages.
Office Action for JP Application No. 2023-542522, dated May 29, 2024.

(Continued)

*Primary Examiner* — Erika A Washington
(74) *Attorney, Agent, or Firm* — Finnegan, Henderson, Farabow, Garrett & Dunner, L.L.P.

(57) ABSTRACT

A method for data transmission is performed by a packet data convergence protocol (PDCP) entity. The PDCP entity is associated with a radio link control (RLC) entity in an unacknowledged mode (UM). The method includes: determining a target working mode of the PDCP entity; and sending a data packet to a high layer protocol entity in a numbering order based on the target working mode.

18 Claims, 5 Drawing Sheets

(56) References Cited

OTHER PUBLICATIONS

CMCC, "Introducing Transmission Mode for PDCP Operation", 3GPP TSG-RAN WG2 Meeting #98, R2-1705784, Hangzhou, China, May 15-19, 2017.
3GPP TS 36.323 V16.3.0 (Dec. 2020), 3rd Generation Partnership Project; Technical Specification Group Radio Access Network; Evolved Universal Terrestrial Radio Access(E-UTRA); Packet Data Convergence Protocol (PDCP) specification (Release 16).
Request for the Submission of an Opinion for Korean Application No. 10-2023-7026595, dated Aug. 8, 2025, 13 pages.
Samsung, LG Electronics Inc., Nokia, Nokia Shanghai Bell, Intel, Apple; RAN2, "CR on RLC out-of-order delivery configuration", 3GPP TSG RAN WG2 Meeting #101-e, R2-2004826, e-Meeting, Jun. 1-11, 2020, 6 pages.

* cited by examiner

DATA TRANSMISSION METHOD AND APPARATUS

CROSS-REFERENCE TO RELATED APPLICATION

This application is the U.S. national application of International Application No. PCT/CN2021/071612, filed on Jan. 13, 2021, the entire contents of which are incorporated herein by reference.

TECHNICAL FIELD

The present disclosure relates to a field of mobile communication, and particularly refers to a method and an apparatus for data transmission.

BACKGROUND

A multimedia broadcast and multicast service (MBMS) or a multicast broadcast service (MBS) may be sent via a specific MBS radio bearer (MRB). The MBS may include a common MBS bearer and a separate MBS bearer. The common MBS bearer includes a packet data convergence protocol (PDCP) entity associated with a radio link control (RLC) entity. The separate MBS bearer includes a PDCP associated with two RLC entities.

The RLC entity may be in any one of a transparent mode (TM), an unacknowledged mode (UM) and an acknowledged mode (AM) based on a configuration of a network side.

In the TM, data received from a media access control address (MAC) layer is directly transparently transmitted to the PDCP entity;

In the UM, a data packet received from the MAC layer is transmitted backward to the PDCP entity, but the RLC entity does not support feeding back whether an RLC data packet is successfully received to a peer RLC entity; and In the AM, a data packet received from the MAC layer is transmitted backward to the PDCP entity, and the RLC entity supports feeding back whether an RLC data packet is successfully received to a peer RLC entity. The RLC entity may resend the data packet that has not been received based on a feedback message.

In the related art, the PDCP entity associated with the RLC entity in the UM often directly delivers the received data packet to a high layer protocol entity in a handover process.

SUMMARY

According to a first aspect of the present disclosure, a method for data transmission is performed by the PDCP entity. The PDCP entity is associated with a radio link control (RLC) entity in an unacknowledged mode (UM). The method includes: determining a target working mode of the PDCP entity; and sending a data packet to a high layer protocol entity in a numbering order based on the target working mode.

According to a second aspect of the present disclosure, a communication device includes: at least one processor; and a memory communicatively connected to the at least one processor. The memory stores instructions executable by the at least one processor. The at least one processor is configured to determine a target working mode of the PDCP entity; and send a data packet to a high layer protocol entity in a numbering order based on the target working mode.

According to a third aspect of embodiments of the present disclosure, a computer storage medium stored with computer executable instructions is provided. When the computer executable instructions are executed by a processor, the method for data transmission according to the first aspect of the present disclosure is implemented.

BRIEF DESCRIPTION OF THE DRAWINGS

Example embodiments will be described in detail below in conjunction with the accompanying drawings, in which.

DETAILED DESCRIPTION

Embodiments of the present disclosure are described in detail below. Examples of the embodiments are shown in the accompanying drawing, in which the constant same or similar labels indicate the same or similar components or components with the same or similar functions. The embodiments described below reference to the accompanying drawings are exemplary, and are intended to explain the disclosure, but should not be understood as a limitation to the disclosure.

Figure 1:
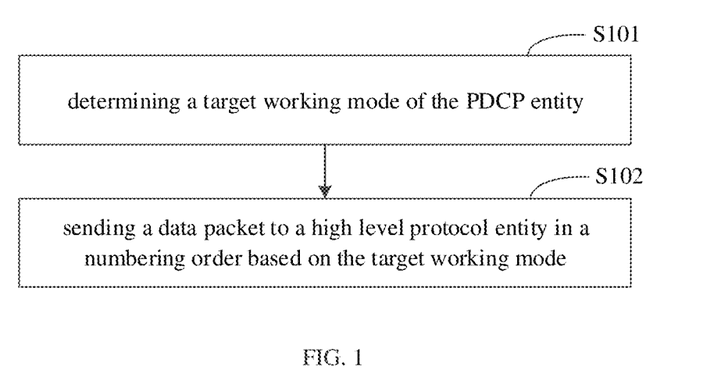
FIG. 1 is a diagram illustrating a method for data transmission according to an embodiment of the present disclosure.

FIG. 1 is a flowchart illustrating a method for data transmission according to an embodiment of the present disclosure. An executive body of the method for data transmission is a packet data convergence protocol (PDCP) entity associated with a radio link control (RLC) entity in an unacknowledged mode (UM). Optionally, at least one of one or more RLC entities associated with the PDCP entity is configured in the UM. The PDCP entity may be a PDCP entity in a user equipment (UE) or a network device. The PDCP entity in the UE and the PDCP entity in the network device are peer PDCP entities.

As illustrated in FIG. 1, the method for data transmission includes the following steps.

At S101, a target working mode of the PDCP entity is determined.

In the embodiments of the present disclosure, a plurality of working modes are configured for the PDCP entity. The target working mode may be determined from the plurality of working modes for the PDCP entity by means of a protocol agreement or configuration indication information.

In an implementation, the target working mode of the PDCP entity may be determined by using the protocol agreement. Optionally, in response to the PDCP entity needing to be reestablished, a working mode used by each RLC entity associated with the PDCP entity is determined, and the target working mode used by the PDCP entity is determined based on the working mode used by each RLC entity.

In an implementation, each working mode may have one piece of identity information, so that indication information may be further configured. The indication information is configured with identity information of the target working mode that needs to be selected. The PDCP entity determines the target working mode to be used based on the indication information.

At S102, a data packet is sent to a high layer protocol entity in a numbering order based on the target working mode.

The working mode of the PDCP entity may be one of a working mode A and a working mode B.

In the working mode A, an old protocol data unit (PDU) data packet stored in the PDCP entity is directly delivered. In some implementations, the working mode A may include a first working mode and a second working mode. Optionally, the first working mode is labeled as a working mode 1-1, and the second working mode is labeled as a working mode 1-2, which are merely examples, and cannot be used as a limitation of the present disclosure.

Optionally, in the working mode 1-1, the PDCP entity may reorder all the stored old data packets (for example, the old data packets may be reordered in a numbering order from small to large) before receiving a new data packet, and deliver the reordered old data packets to the high layer protocol entity in the numbering order. Further, the PDCP entity continues receiving new data packets, reorders the new data packets and delivers the reordered new data packets to the high layer protocol entity in the numbering order.

Optionally, in the working mode 1-2, the PDCP entity may reorder all the stored old data packets (for example, the old data packets may be reordered in a numbering order from small to large) before receiving the new data packets, deliver the reordered data packets to the high layer protocol entity in the numbering order, and initialize a variable related to a reordering window. Further, the PDCP entity continues receiving new data packets, reorders the new data packets and delivers the reordered data packets to the high layer protocol entity in the numbering order.

It should be noted that the working mode 1-1 does not initialize the reordering window relative to the working mode 1-2, so that data may be sent by continuously using a data packet count, and a delay of sending data may be further reduced.

In the working mode B, the old data packets stored in the PDCP entity are awaiting to receive new data packets, and all data packets in the PDCP entity are reordered before delivering. Optionally, the PDCP entity first processes all the old data packets stored before receiving the new data packets. Further, the PDCP entity receives the new data packets for processing. The PDCP entity performs an overall reordering on the processed old data packets and the processed new data packets, and delivers the reordered old data packets and the reordered new data packets to the high layer protocol entity in the numbering order. In the embodiments of the present disclosure, the working mode B may be referred to as a third working mode.

In an implementation, a timer for reordering may be stopped. In some implementations, a reordering timer (i.e., t-Reordering) is preconfigured for reordering. The reordering timer performs a timing when the reordering starts, and is stopped in response to reaching a reordering timing value. For example, before a data packet with a larger count is delivered to the high layer protocol entity, if a data packet with a smaller count is not received, the data packet with the smaller count is awaited to arrive within a timing duration of the reordering timer. In response to the reordering timer being timeout, the data packet with the smaller count is not awaited, while the data packet with the larger count is directly delivered to the high layer protocol entity, and the reordering timer is stopped. That is, in response to reaching the timing duration of the reordering timer, the PDCP entity does not await the data packet with the smaller count that still has not been received, and directly delivers the existing received ordered data packet to the high layer protocol entity.

The PDCP entity reorders the data packets based on a data packet count (COUNT) by using a reordering window mechanism. A maximum value of a number of counts for PDCP COUNT that the PDCP entity may use to reorder is half of a maximum number of the PDCP serial number (SN), that is, a size of the reordering window is Window_Size=$2^{[pdcp\text{-}SN\text{-}Size\ DL]\text{-}1}$, where the "pdcp-SN-SizeDL" is a number of bits of the PDCP SN.

In the embodiments of the present disclosure, different working modes can be configured for the PDCP entity based on different service scenarios, thus improving the flexibility of data transmission of the PDCP entity. Moreover, a reordering may be performed in each working mode. In the working mode A, data packets may be delivered to an application service more rapidly, thus reducing the delay. In the working mode B, there is a function that supports awaiting new data packets not successfully received, which may reduce a loss of a data packet.

Figure 2:
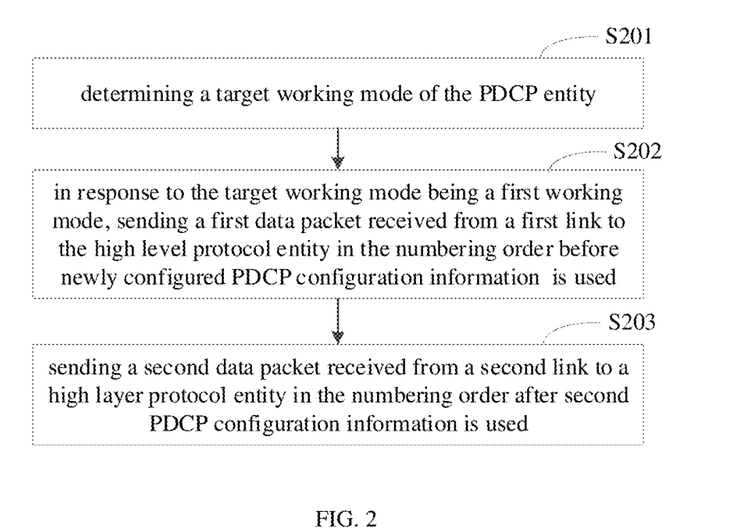
FIG. 2 is a diagram illustrating another method for data transmission according to an embodiment of the present disclosure.

Taking the target working mode configured for the PDCP entity is the working mode 1-1 in the working mode A i.e. the first working mode as an example, a data transmission process of the PDCP entity is described. FIG. 2 is a flowchart illustrating another method for data transmission according to an embodiment of the present disclosure. An executive body of the method for data transmission is a packet data convergence protocol (PDCP) entity associated with a radio link control (RLC) entity in an unacknowledged mode (UM).

At S201, a target working mode of the PDCP entity is determined.

With respect to the step S201, any possible implementation in the embodiments of the disclosure may be adopted, which will not be repeated here.

At S202, in response to the target working mode being a first working mode, a first data packet received from a first link is sent to the high layer protocol entity in the numbering order before newly configured PDCP configuration information is used.

It needs to be noted that, in order to distinguish the newly configured PDCP configuration information from previously configured PDCP configuration information, in the embodiments of the present disclosure, the previously configured PDCP configuration information is referred to first PDCP configuration information, and the newly configured PDCP configuration information is referred to second PDCP configuration information. That is, the first PDCP configuration information is PDCP configuration information used before the PDCP entity uses the second PDCP configuration information.

For example, a network side enables that the PDCP entity is in the working mode 1-1 by a configuration indication, and before the configuration indication is received, an old configuration used by the PDCP entity is the first PDCP configuration information. At the same time or after the network side configures and indicates that the PDCP entity is in the working mode 1-1. Optionally, the network side indicates a new configuration of the PDCP entity, and the new configuration adopted by the PDCP entity is the second PDCP configuration information.

The following embodiments describe the method for data transmission according to the present disclosure by the first PDCP configuration information and the second PDCP configuration information.

Before the second PDCP configuration information is used, the first data packet received from the first link is processed before being sent to the high layer protocol entity based on the first PDCP configuration information, and the processed first data packet is sent to the high layer protocol entity in the numbering order.

For example, the first link may be a source link in a handover process, and the first data packet may be a data packet delivered to a PDCP entity from an RLC entity associated with the source link.

In the embodiments of the present disclosure, the data packet that has been received before the PDCP entity uses the second PDCP configuration information is referred to as a first data packet, and the first data packet is old data stored in the PDCP entity.

Optionally, the first data packet may include at least one of:
 a protocol data unit (PDU) data packet cached in the PDCP entity;
 a PDU data packet received from the first link before the second PDCP configuration information is used, for example, the PDCP entity is an entity at a UE side, and the PDU data packet that has been received may be a PDU data packet received from a source cell in a UE handover process; or
 a PDU data packet delivered to the PDCP entity in a reestablishing process of a low layer protocol entity before second PDCP configuration information is used, for example, a data packet stored in the RLC entity is delivered to a PDCP entity in a reestablishing process of the RLC entity.

Optionally, each of the first PDCP configuration information and the second PDCP configuration information includes at least an encryption algorithm and an encryption key.

Optionally, the PDCP configuration information may further include at least one of:
 a packet header decompression/compression configuration; or an integrity protection algorithm and an integrity protection key.

The packet header decompression/compression configuration includes at least one of: a robust header compression (ROHC) configuration or an Ethernet header compression (EHC) configuration. Optionally, the ROHC configuration includes a ROH compression/decompression configuration; and the EHC configuration includes an EHC compression/decompression configuration.

Optionally, the second PDCP configuration information further includes indication information for indicating whether a packet header decompression/compression configuration context configured in the first PDCP configuration information continues to be used.

For example, for the case where the ROHC configuration is configured, the second PDCP configuration information may further indicate whether a ROHC compression context configured in the first PDCP configuration information may continue to be used. In the implementation, the second PDCP configuration information may carry drb-ContinueROHC indication information that indicates whether the ROHC compression context configured in the first PDCP configuration information may continue to be used.

For the case where the EHC configuration is configured, the second PDCP configuration information may further indicate whether an EHC compression context configured in the first PDCP configuration information may continue to be used. In the implementation, the second PDCP configuration information may carry drb-ContinueEHC indication information that indicates whether the EHC compression context configured in the first PDCP configuration information may continue to be used.

Optionally, the second PDCP configuration information configures packet header decompression/compression, and does not indicate that the header decompression/compression context configured in the first PDCP configuration information may continue to be used, and the PDCP entity performs a packet header decompression on a second data packet by using the packet header decompression/compression configured in the second PDCP configuration information. For example, in the case that there is no indication "drb-ContinueROHC" for the ROHC or no indication "drb-ContinueEHC" for the EHC, that is, there is no indication that the packet header decompression/compression context configured in the first PDCP configuration information may continue to be used. At this time, when the PDCP entity applies the packet header decompression/compression configuration configured in the second PDCP configuration information, the packet header decompression/compression configuration configured in the first PDCP configuration information is not available.

Optionally, the second PDCP configuration information configures packet header decompression/compression, and indicates that the packet header decompression/compression context configured in the first PDCP configuration information may continue to be used, and the PDCP entity performs a packet header decompression on the second data packet by using the packet header decompression/compression configured in the first PDCP configuration information. For example, in the case that there is the indication "drb-ContinueROHC" for the ROHC, or the indication "drb-ContinueEHC" for the EHC, that is, there is an indication that the packet header decompression/compression context configured in the first PDCP configuration information may continue to be used. At this time, the PDCP entity performs a packet header decompression/compression on the second data packet by using the packet header decompression/compression configuration configured in the first PDCP configuration information.

In the embodiments of the present disclosure, the processing for the first data packet includes a decryption processing and a reordering.

Before the second PDCP configuration information is used, the PDCP entity reorders the received first data packet in the numbering order based on the first PDCP configuration information. In some implementations, the PDCP entity performs a decryption processing on the first data packet based on the first PDCP configuration information, and reorders the decrypted first data packet in the numbering order.

Optionally, the processing for the first data packet may further include at least one of: a packet header decompression/compression processing or an integrity verification processing.

It should be noted that, in response to the first PDCP configuration information being configured with the packet header decompression/compression configuration, the processing for the first data packet may include the packet header decompression/compression processing. The packet header decompression may be performed in a numbering order of the data packet. For example, the decompression may be performed sequentially in the numbering order from small to large.

In response to the first PDCP configuration information being configured with an integrity protection algorithm and an integrity protection key, the processing for the first data packet may include the integrity verification processing.

In an implementation, in response to the first data packet being a processed data packet, the PDCP entity no longer performs the above processing on the first data packet by using the first PDCP configuration information, for example, the decryption processing, the packet header decompression/compression processing and/or the integrity verification processing. That is, before a target working mode used by the PDCP entity is determined, in response to determining that the PDCP entity has performed the above processing on the first data packet by using the first PDCP configuration information, the PDCP entity no longer perform the above processing by using the first PDCP configuration information. For example, the PDCP entity may generally perform a decryption processing on the first packet by using the first PDCP configuration information immediately after receiving the first data packet, without awaiting to reorder in the numbering order of the data packet and then performing decryption. In the embodiments of the present disclosure, when the first data packet is a decrypted data packet in response to receiving an indication of the working mode, the PDCP entity does not perform a decryption process on the stored first data packet.

Further, the PDCP entity reorders the processed first data packet in the numbering order of the data packet. For example, the reordering may be performed in the numbering order of the data packet from small to large.

Figure 3:
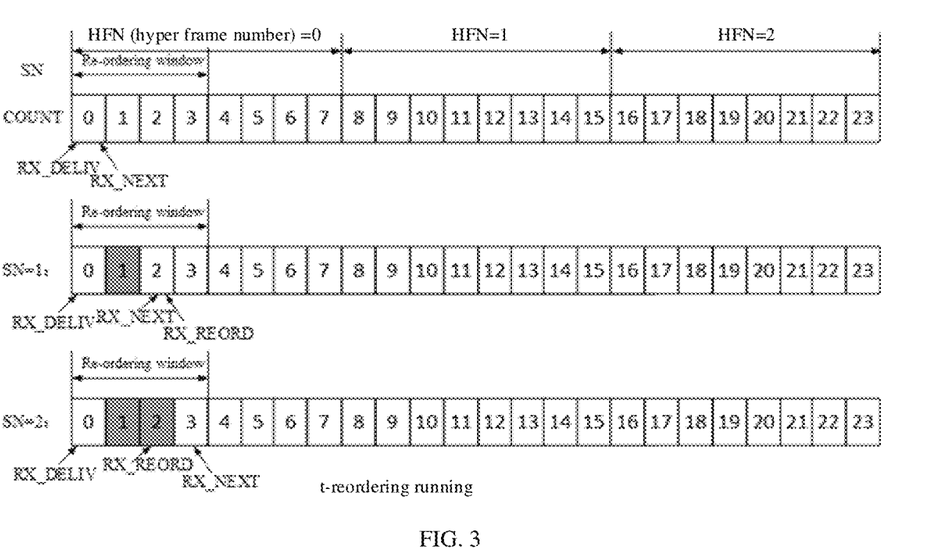
FIG. 3 is a diagram illustrating a reordering window according to an embodiment of the present disclosure.

The PDCP entity reorders the data packet by using a reordering window mechanism. FIG. 3 is a diagram illustrating a reordering window. As illustrated in FIG. 3, a variable of a lower boundary of the reordering window is "RX_DELIV". The "RX_DELIV" indicates a count of a PDU data packet not delivered to the high layer protocol entity. The PDCP entity updates the variable "RX_DELIV" of the lower boundary of the reordering window based on the count of the PDU data packet delivered to the high layer protocol entity. For awaiting to receive a PDU data packet, the PDCP entity may start a reordering timer, and when the reordering timer is timeout, the PDCP entity ignores the "count of the PDU data packet awaiting to be received", and updates the lower boundary of the reordering window. If the PDCP receives a data packet outside the reordering window, the PDCP entity may discard the data packet. A variable of "RX_REORD" indicates a count of a data packet when starting a reordering timer. "RX_NEXT" indicates a count of a next PDU data packet to be received. As illustrated in FIG. 3, initial values of both "RX_DELIV" and "RX_NEXT" of the PDCP entity are "0". When a PDU data packet with the count being "1" is received, it indicates that a PDU data packet with the count being "0" is not received. The PDCP entity updates "RX_NEXT" to "2", in response to the reordering timer needing to be started, "RX_REOR" is set to "2". When the PDU data packet with the count being "2" is received, "RX_NEXT" is updated to "3".

In the embodiments of the present disclosure, when the PDCP entity is in the working mode 1-1, the first data packet is directly delivered in the numbering order without awaiting to receive a subsequent data packet.

The PDCP entity may generate a vacant count in the reordering window when reordering the first data packet. In the embodiments of the present disclosure, the PDCP stops awaiting to receive a data packet corresponding to the vacant count, and may directly deliver the first data packet to the high layer protocol entity in the numbering order. For example, the PDCP entity processes PDU data packets -1/3 and delivers the processed PDU data packets -1/3 to the high layer protocol entity by using the first PDCP configuration information. Since the reordering window is not initialized, the PDCP entity may continue to use a previous count and receive PDU data packets -0/2/4, and the PDU data packets -1/3 may generate a vacancy in the reordering window. The PDCP entity may ignore receiving the PDU data packets -1/3 corresponding to vacant counts. For example, a reordering timer may not be started.

At S203, a second data packet received from a second link is sent to a high layer protocol entity in the numbering order after second PDCP configuration information is used.

In some implementations, the PDCP entity performs a processing on the second data packet received from the second link based on the second PDCP configuration information, and reorders the processed second data packet based on the data packet count. For example, the second link may be a target link in a handover process. The second data packet may be a data packet delivered from an RLC entity associated with a target link to the PDCP entity.

In the embodiments of the present disclosure, the processing for the second data packet includes a decryption processing and a reordering.

Optionally, the processing for the second data packet may further include at least one of: a packet header decompression/compression processing or an integrity verification processing.

It should be noted that, in response to the second PDCP configuration information being configured with the packet header decompression/compression configuration, the processing for the second data packet may include a packet header decompression/compression processing.

In response to the second PDCP configuration information being configured with an integrity protection algorithm and an integrity protection key, the processing for the second data packet may include the integrity verification processing.

Further, the PDCP entity reorders the processed second data packet in an order of the data packet count. For example, the reordering may be performed in the order of the data packet count from small to large.

In the embodiments of the present disclosure, since the PDCP entity does not initialize variables related to the reordering window, when a peer PDCP entity numbers a new data packet (that is, the second data packet) by using the second PDCP configuration information, a count of the second data packet is a subsequent count of the count of the first data packet. Correspondingly, the count of the second data packet received by the PDCP entity and the count of the first data packet are consecutive counts, and the count of the second data packet is a subsequent count of the count of the first data packet. For example, when the PDCP entity delivers the processed PDU data packets to the high layer protocol entity after processing PDU data packets -1/3 by using the first PDCP configuration information, since the reordering window is not initialized in the working mode 1-1, a count of sending data of the peer PDCP entity of the PDCP entity starts from 4, and the peer PDCP entity sends PDU data packets -4/5 to the PDCP entity.

Further, the PDCP entity delivers the second data packet to the high layer protocol entity in a reordered numbering order.

Taking the target working mode being configured as the working mode 1-1 for example, before a new data packet is received or second configuration information is used, the PDCP entity processes the stored first data packet based on the first PDCP configuration information, reorders the processed first data packet in an order of data packet counts (for example, from small to large), and delivers the processed data packet to the high layer protocol entity sequentially. For example, in the first PDCP configuration information, an encryption configuration-1 and a packet header compression configuration-1 are configured for the PDCP entity. A PDCP data packet-2 and a PDCP data packet-4 are stored in the reordering window of the PDCP entity, which are first data packets that have been received by the PDCP entity. If the PDCP data packets -2/4 have been decrypted by the encryption configuration-1, and have not been decompressed yet, the PDCP data packet -2/4 need to be decompressed by using the packet header compression configuration-1, and they are then delivered to the high layer protocol entity in the order of the data packet counts. That is, the PDCP entity does not need to await receiving the PDCP data packet-1 and the PDCP data packet 3, before the PDCP data packets -1/2/3/4 are delivered to the high layer protocol entity sequentially.

In some embodiments, the method may further include the following steps.

At S204, data packet count information of the first data packet delivered to the high layer protocol entity is fed back to a peer PDCP entity.

The count information includes at least one of:
a maximum count of the first data packet processed by the first PDCP configuration information and delivered to the high layer protocol entity;
a maximum count of the first data packet processed by the first PDCP configuration information and delivered to the high layer protocol entity, plus 1;
a maximum count of the first data packet processed by the first PDCP configuration information and delivered to the high layer protocol entity, minus 1;
a minimum count of the first data packet processed by the first PDCP configuration information and delivered to the high layer protocol entity;
a minimum count of the first data packet processed by the first PDCP configuration information and delivered to the high layer protocol entity, plus 1;
a minimum count of the first data packet processed by the first PDCP configuration information and delivered to the high layer protocol entity, minus 1; or
a total data volume of the first data packet processed by the first PDCP configuration information and delivered to the high layer protocol entity.

In the embodiments of the present disclosure, in response to a reestablishing indication of the PDCP entity, the target working mode is configured as the working mode 1-1. In this case, the PDCP entity may acquire the second PDCP configuration information, and an encryption configuration-2 and a packet header compression configuration-2 are configured in the second PDCP configuration information. The PDCP entity receives a new data packet (that is, the second data packet) based on the second PDCP configuration information, and processes the second data packet. That is, the PDCP entity decrypts the PDCP data packets -2/4 by using the encryption configuration-2, and delivers the decompressed PDCP data packets -2/4 to the high layer protocol entity in a numbering order of the data packets after decompression by using the packet header compression configuration -2.

In the embodiments of the present disclosure, when the target working mode of the PDCP entity is configured as the working mode 1-1, a data transmission is performed based on the working mode 1-1. Since waiting for reception of the vacant data packets stops, a data packet may be delivered to an application service more rapidly, thus reducing a delay. Moreover, the reordering window is not initialized in the working mode 1-1, so that data may be sent by continuously using the data packet count, and a sending delay of data may be further reduced.

Figure 4:
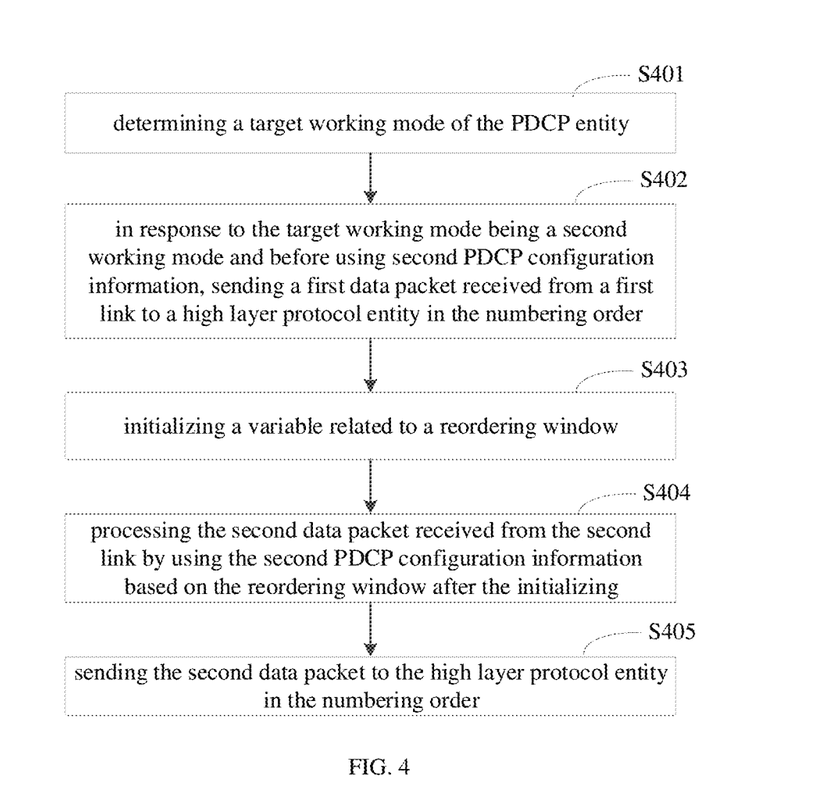
FIG. 4 is a diagram illustrating another method for data transmission according to an embodiment of the present disclosure.

Taking the target working mode configured for the PDCP entity being a working mode 1-2 in the working mode A (i.e. the second working mode) as an example, a data transmission process of the PDCP entity is described. FIG. 4 is a flowchart illustrating another method for data transmission according to an embodiment of the present disclosure. An executive body of the method for data transmission is a packet data convergence protocol (PDCP) entity associated with a radio link control (RLC) entity in an unacknowledged mode (UM).

At S401, a target working mode of the PDCP entity is determined.

At S402, in response to the target working mode being a second working mode, a first data packet received from a first link is sent to a high layer protocol entity in the numbering order before second PDCP configuration information is used.

With respect to the steps S401 to S402, any one possible implementation of the embodiments of the disclosure may be adopted, which will not be repeated here.

At S403, a variable related to a reordering window is initialized.

As illustrated in FIG. 3, in the embodiment of the present disclosure, setting the variable related to the reordering window to an initial value, includes at least one of:
setting "a variable for indicating a next data packet to be received" to an initial value, for example, "RX_NEXT" may be set to an initial value"0"; or
setting "a variable for indicating a lower boundary of a reordering window" to an initial value, for example, "RX_DELIV" may be set to an initial value "0".

At S404, the second data packet received from the second link is processed by using the second PDCP configuration information based on the reordering window after the initializing.

When the reordering window is initialized, the variable related to the reordering window may start counting from the initial value. Further, in the embodiment of the present disclosure, the processing for the second data packet includes a decryption processing and a reordering. Optionally, the processing for the second data packet may further include at least one of: a packet header decompression/compression processing or an integrity verification processing.

It should be noted that, in response to the second PDCP configuration information being configured with the packet header decompression/compression configuration, the processing for the second data packet may include the packet header decompression/compression processing. In response to the second PDCP configuration information being configured with an integrity protection algorithm and an integrity protection key, the processing for the second data packet may include the integrity verification processing.

When the PDCP entity delivers the processed PDU data packets to the high layer protocol entity after processing the PDU data packets -1/3 by using the first PDCP configuration information, since the reordering window may be initialized in the working mode 1-2, the peer PDCP entity may renumber counts of the PDU data packets -2/4 that have been not sent yet, that is, the peer PDCP entity starts sending the PDU data packets from an initial count being 0, and may not generate vacant counts 1/3 just like in the working mode 1-1 within the reordering window.

At S405, the second data packet is sent to the high layer protocol entity in the numbering order.

Further, the PDCP entity reorders the processed second data packet in the numbering order of the data packet, and sends the second data packet to the high layer protocol entity in a numbering order. For example, the reordering may be performed in the order of data packet counts from small to large.

The descriptions of the first PDCP configuration information and the second PDCP configuration information may refer to the descriptions of relevant contents in the above embodiments, which will not be repeated here.

A process of processing the first data packet based on the first PDCP configuration information and a process of processing the second data packet based on the second PDCP configuration information may refer to the descriptions of relevant contents in the above embodiments, which will not be repeated here.

In the embodiments of the present disclosure, when the target working mode of the PDCP entity is configured as the working mode 1-2, data transmission is performed based on the working mode 1-2. Since the reordering window is initialized, the vacant counts may not appear, and waiting for reception of the vacant data packets stops, which reduces a reordering delay, so that a data packet may be delivered to the application service more rapidly.

Figure 5:
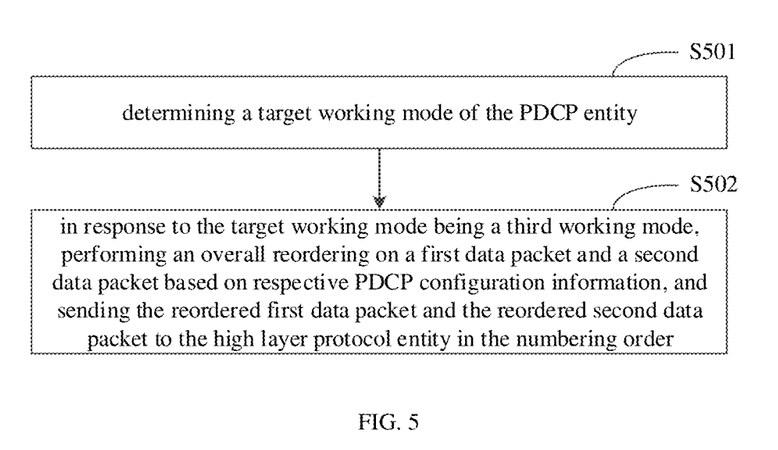
FIG. 5 is a diagram illustrating another method for data transmission according to an embodiment of the present disclosure.

Taking the target working mode configured for the PDCP entity being the working mode B (i.e. a third working mode) as an example, a data transmission process of the PDCP entity is described. FIG. 5 is a flowchart illustrating another method for data transmission according to an embodiment of the present disclosure. An executive body of the method for data transmission is a packet data convergence protocol (PDCP) entity associated with a radio link control (RLC) entity in an unacknowledged mode (UM).

At S501, a target working mode of the PDCP entity is determined.

With respect to the step S501, any possible implementation of the embodiments of the disclosure may be adopted, which will not be repeated here.

At S502, in response to the target working mode being a third working mode, an overall reordering is performed on a first data packet and a second data packet based on respective PDCP configuration information, and the reordered first data packet and the reordered second data packet are sent to the high layer protocol entity in the numbering order.

It should be noted that, the first data packet is a data packet received from a first link, the first data packet corresponds to first PDCP configuration information, and the first PDCP configuration information is previously configured PDCP configuration information. Optionally, the first link may be a source link in a handover process, and the first data packet may be a data packet delivered to a PDCP entity from an RLC entity associated with the source link.

The second data packet is a data packet received from a second link, the second data packet corresponds to second PDCP configuration information, and the second PDCP configuration information is newly configured PDCP configuration information. Optionally, the second link may be a target link in the handover process, and the second data packet may be a data packet delivered to a PDCP entity from an RLC entity associated with the target link.

The PDCP entity processes the first data packet by using the first PDCP configuration information before the second PDCP configuration information is used. The processing may at least include a decryption processing. The process of decrypting the first data packet by using the first PDCP configuration information may refer to the descriptions of relevant contents in the above embodiments, which will not be repeated here.

The PDCP entity processes the second data packet by using the second PDCP configuration information. The processing at least may include a decryption processing. The process of decrypting the second data packet by using the second PDCP configuration information may refer to the descriptions of relevant contents in the above embodiments, which will not be repeated here.

Further, the PDCP entity reorders the processed first data packet and the second data packet, and sends all the reordered data packets to the high layer protocol entity in a numbering order.

For example, in the first PDCP configuration information, an encryption configuration-1 and a packet header compression configuration-1 are configured for the PDCP entity. First data packets -2/4 are stored in a reordering window of the PDCP entity-1. These data packets have been decrypted by the encryption configuration-1, and have not been decompressed. The PDCP entity may need to awaiting reception of the data packets -1/3 and reorder all the data packets -1/2/3/4, and delivers the reordered data packets to the high layer protocol entity in the numbering order. Further, the target working mode configured for the PDCP is the working mode B, and second PDCP configuration information is provided. In the second PDCP configuration information, an encryption configuration-2 and a packet header compression configuration-2 are configured for the PDCP entity. The first data packets -2/4 are decompressed by the PDCP entity by using the packet header compression configuration-1 and stored in the PDCP entity. The PDCP entity applies the encryption configuration-2 and the packet header compression configuration-2 configured in the second PDCP configuration information, decrypts the second data packets -1/3 by using the encryption configuration-2 and decompresses the decrypted second data packets -1/3 by using the packet header compression configuration-2. The PDCP entity delivers all the data packets -1/2/3/4 to the high layer protocol entity sequentially in the numbering order.

In the embodiments of the present disclosure, when the target working mode of the PDCP entity is configured as the working mode B, data transmission is performed based on the working mode B. The working mode B has a function that supports awaiting data packets that are not successfully received, which reduces a loss of a data packet.

Figure 6:
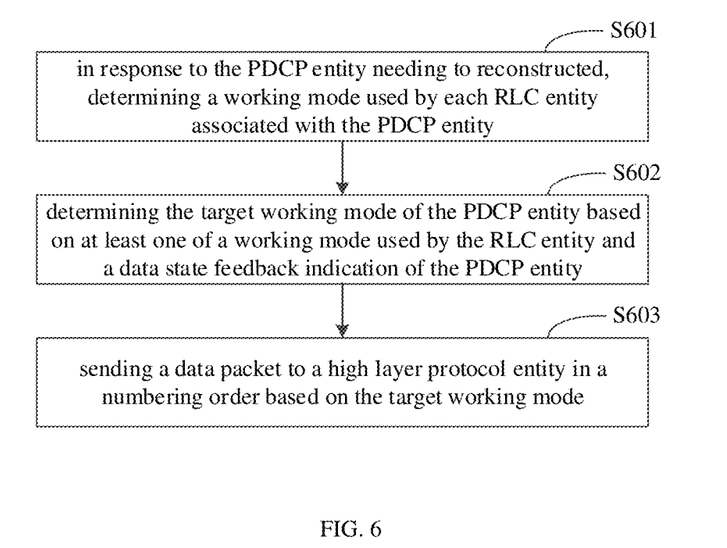
FIG. 6 is a diagram illustrating another method for data transmission according to an embodiment of the present disclosure.

FIG. 6 is a flowchart illustrating another method for data transmission according to an embodiment of the present disclosure. An executive body of the method for data transmission is a packet data convergence protocol (PDCP) entity associated with a radio link control (RLC) entity in an unacknowledged mode (UM).

At S601, in response to the PDCP entity needing to reestablished, a working mode used by each RLC entity associated with the PDCP entity is determined.

In the embodiments of the present disclosure, a target working mode of the PDCP entity is determined by means of a protocol agreement. The working mode adopted by each RLC entity associated with the PDCP entity often affects a working mode adopted by the PDCP entity. Therefore, it may be reached in the protocol agreement that a target working mode of the PDCP entity based on the working mode adopted by the RLC entity.

An indication of reestablishing the PDCP entity may be received. When the reestablishing indication is received, it is triggered to determine a working mode adopted by the RLC entity associated with the PDCP entity. The working mode adopted by the RLC entity may include one of an AM, a UM, a transparent mode, a multicast mode to receive data and a unicast mode to receive data.

Optionally, whether the PDCP entity feeds back a data receiving state often affects a working mode of the PDCP entity.

At S602, the target working mode of the PDCP entity is determined based on at least one of a working mode used by the RLC entity or a data state feedback indication of the PDCP entity.

In response to only the RLC entity in the UM mode being associated with the PDCP entity, it is determined that the target working mode of the PDCP entity is a working mode A, that is, one of a first working mode and a second working mode, that is, one of a working mode 1-1 and a working mode 1-2. For example, the PDCP entity is associated with one or more RLC entities in the UM. When the PDCP entity is indicated to be reestablished, the PDCP entity may be in the working mode A.

In response to at least one of a plurality of RLC entities associated with the PDCP entity being in the AM, it is determined that the target working mode of the PDCP entity is a first working mode or a third working mode (i.e. a working mode 1-1 in the working mode A or the working mode B). For example, the PDCP entity is associated with two RLC entities, in which the RLC entity-1 is configured in the UM, and the RLC entity-2 is configured in the AM. When the PDCP entity is indicated to be reestablished, the PDCP entity may be in the working mode B In response to the PDCP entity needing to feed back a data receiving state, it is determined that the target working mode of the PDCP entity is a first working mode or a third working mode (i.e. a working mode 1-1 in the working mode A or the working mode B). For example, the PDCP entity is associated with two RLC entities, in which the RLC entity-1 and the RLC entity-2 are configured in the UM. However, the PDCP entity needs to send the data receiving state of the PDCP entity to the peer PDCP entity through the RLC entity-2, that is, for example, needs to send a status report to the peer PDCP entity. When the PDCP entity is indicated to be reestablished, the PDCP entity may be in the working mode B.

In response to at least one of a plurality of RLC entities associated with the PDCP entity receiving data in a multicast mode and the at least one of a plurality of RLC entities receiving data in a unicast mode, it is determined that the target working mode of the PDCP entity is a first working mode or a third working mode, that is, the working mode 1-1 in the working mode A or the working mode B. For example, the PDCP entity is associated with two RLC entities, in which the RLC entity-1 is configured to receive data in a point to multipoint (PTM) mode, and the RLC entity-2 is configured to receive data in a point to point (PTP) mode. When the PDCP entity is indicated to be reestablished, the PDCP entity may be in the working mode B.

The descriptions of the working mode 1-1, the working mode 1-2 and the working mode B may refer to the descriptions of relevant contents in the above embodiments, which will not be repeated here.

At S603, a data packet is sent to a high layer protocol entity in a numbering order based on the target working mode.

With respect to the step S603, any possible implementation of the embodiments of the disclosure may be adopted, which will not be repeated here.

In the embodiments of the present disclosure, different working modes may be configured for the PDCP entity based on different service scenarios, thus improving the flexibility of data transmission of the PDCP entity. Moreover, the reordering may be performed in each working mode. In the working mode A, data packets may be delivered to the application service more rapidly, thus reducing a delay. The working mode B has a function that supports awaiting the new data packets that are not successfully received, which may reduce a loss of a data packet.

Figure 7:
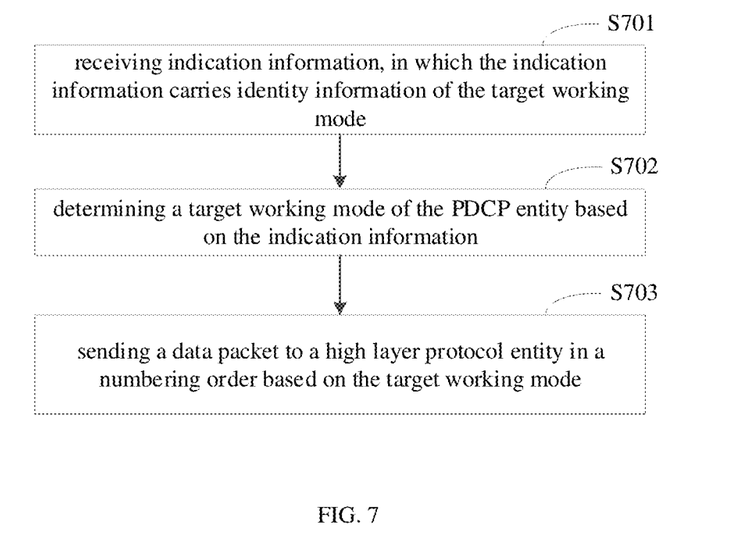
FIG. 7 is a diagram illustrating another method for data transmission according to an embodiment of the present disclosure.

FIG. 7 is a flowchart illustrating another method for data transmission according to an embodiment of the present disclosure. An executive body of the method for data transmission is a packet data convergence protocol (PDCP) entity associated with a radio link control (RLC) entity in an unacknowledged mode (UM).

At S701, indication information is received. The indication information carries identity information of the target working mode.

In the embodiments of the present disclosure, each working mode may have one piece of identity information, so that indication information may be further configured. The indication information is configured with identity information of a target working mode that needs to be selected. The PDCP entity may obtain indication information, and further extract identity information in the target working mode.

At S702, a target working mode of the PDCP entity is determined based on the indication information.

For example, identity information of the first working mode (i.e. the working mode 1-1) may be A-1, identity information of the second working mode (i.e. the working mode 1-2) may be A-2, and identity information of the third working mode (i.e. the working mode B) may be B, For example, it may be indicated based on A-1 carried in reestablishPDCP that, the target working mode used by the PDCP entity is the working mode 1-1. For another example, it may be indicated based on A-2 carried in reestablishPDCP that, the target working mode used by the PDCP entity is the working mode 1-2. For another example, it may be indicated based on B carried in reestablishPDCP that, the target working mode used by the PDCP entity is the working mode B.

At S703, a data packet is sent to a high layer protocol entity in a numbering order based on the target working mode.

With respect to the step S703, any possible implementation of the embodiments of the disclosure may be adopted, which will not be repeated here.

In the embodiments of the present disclosure, different working modes can be configured for the PDCP entity on the basis of different service scenarios, thus improving the flexibility of data transmission of the PDCP entity. Moreover, the reordering may be performed in each working mode. In the working mode A, data packets may be delivered to the application service more rapidly, thus reducing a delay. The working mode B has a function that supports awaiting the new data packets that are not successfully received, which may reduce a loss of a data packet.

Corresponding to the method for data transmission according to the embodiments of the disclosure, an apparatus for data transmission is further provided in the present disclosure. Since the apparatus for data transmission according to the embodiments of the present disclosure corresponds to the method for data transmission according to the embodiments of FIGS. 1 to 7, the implementation of the method for data transmission is also applicable to the apparatus for data transmission according to the embodiment, which will not be described in the embodiments of the disclosure.

Figure 8:
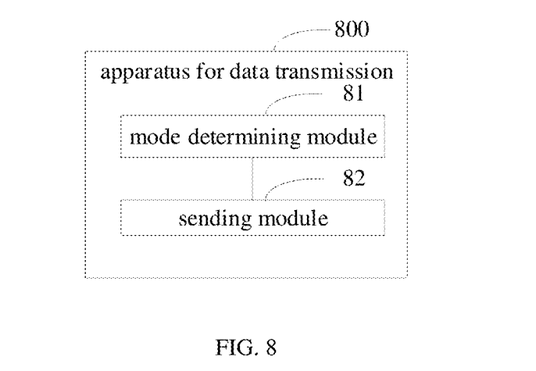
FIG. 8 is a diagram illustrating an apparatus for data transmission according to an embodiment of the present disclosure.

FIG. 8 is a structural diagram illustrating an apparatus for data transmission according to an embodiment of the present disclosure. The apparatus for data transmission is applicable to a PDCP entity, and the PDCP entity is associated with an RLC entity in a UM. Optionally, at least one of one or more RLC entities associated with the PDCP entity is configured in the UM. The PDCP entity may be a PDCP entity in a user equipment (UE) or a network device. The PDCP entity in the UE and the PDCP entity in the network device are peer PDCP entities.

As illustrated in FIG. 8, an apparatus 800 for data transmission may include a mode determining module 81 and a sending module 82.

The mode determining module 81 is configured to determine a target working mode of the PDCP entity.

The sending module 82 is configured to send a data packet to a high layer protocol entity in a numbering order based on the target working mode.

In the embodiments of the present disclosure, a plurality of working modes are configured for the PDCP entity. The target working mode from the plurality of working modes for the PDCP entity by means of a protocol agreement or configuration indication information.

In an implementation, the target working mode of the PDCP entity may be determined by using the protocol agreement. Optionally, in response to the PDCP entity needing to be reestablished, a working mode used by each RLC entity associated with the PDCP entity is determined, and the target working mode used by the PDCP entity is determined based on the working mode used by the RLC entity.

In an implementation, each working mode may have one piece of identity information, so that indication information may be further configured. The indication information is configured with identity information of the target working mode that needs to be selected. The PDCP entity determines the target working mode to be used based on the indication information.

The working mode of the PDCP entity may be one of a working mode A and a working mode B.

In the working mode A, an old protocol data unit (PDU) data packet stored in the PDCP entity is directly delivered. In some implementations, the working mode A may include a first working mode and a second working mode. Optionally, the first working mode is labeled as a working mode 1-1, and the second working mode is labeled as a working mode 1-2, which are merely examples, which cannot be used as a limitation of the present disclosure.

Optionally, in the working mode 1-1, the PDCP entity may reorder all the stored old data packets (for example, the old data packets may be reordered in a numbering order from small to large) before receiving a new data packet, and deliver the reordered old data packets to the high layer protocol entity in the numbering order. Further, the PDCP entity continues receiving new data packets, reorders the new data packets and delivers the reordered data packets to the high layer protocol entity in the numbering order.

Optionally, in the working mode 1-2, the PDCP entity may reorder all the stored old data packets (for example, the old data packets may be reordered in a numbering order from small to large) before receiving the new data packets, and deliver the reordered data packets to the high layer protocol entity in the numbering order, and initialize a variable related to a reordering window. Further, the PDCP entity continues receiving new data packets, reorders the new data packets and delivers the reordered data packets to the high layer protocol entity in the numbering order.

It should be noted that the working mode 1-1 does not initialize the reordering window relative to the working mode 1-2, so that data may be sent by continuously using a data packet count, and a delay of sending data may be further reduced.

In the working mode B, the old data packets stored in the PDCP entity are awaiting to receive new data packets, and all data packets in the PDCP entity are reordered before delivering. Optionally, the PDCP entity first processes all the old data packets stored before receiving the new data packets. Further, the PDCP entity receives the new data packets for processing. The PDCP entity performs an overall reordering on the processed old data packets and the processed new data packets, and delivers the reordered old data packets and the reordered new data packets to the high layer protocol entity in the numbering order. In the embodiments of the present disclosure, the working mode B may be referred to as a third working mode.

In an implementation, a timer for reordering may be stopped. In some implementations, a reordering timer (i.e., t-Reordering) is preconfigured for reordering. The reordering timer performs a timing when the reordering starts, and is stopped in response to reaching a reordering timing value. For example, before a data packet with a larger count is delivered to the high layer protocol entity, if a data packet with a smaller count is not received, the data packet with the smaller count is awaited to arrive within a timing duration of the reordering timer. In response to the reordering timer being timeout, the data packet with the smaller count is no longer awaited, while the data packet with the larger count is directly delivered to the high layer protocol entity, and the reordering timer is stopped. That is, in response to reaching the timing duration of the reordering timer, the PDCP entity no longer awaits the data packet with a smaller count that still has not been received, and directly delivers the existing received ordered data packet to the high layer protocol entity.

The PDCP entity reorders the data packets based on a data packet count (COUNT) by using a reordering window mechanism. A maximum value of a number of counts for PDCP COUNT that the PDCP entity may use to reorder is half of a maximum number of the PDCP serial number (SN), that is, a size of the reordering window is Window_Size=$2^{[pdcp\text{-}SN\text{-}Size\ DL]-1}$ and "pdcp-SN-SizeDL" is a number of bits of the PDCP SN.

In the embodiments of the present disclosure, different working modes may be configured for the PDCP entity based on different service scenarios, thus improving the flexibility of data transmission of the PDCP entity. Moreover, the reordering may be performed in each working mode. In the working mode A, data packets may be delivered to the application service more rapidly, thus reducing a delay. The working mode B has a function that supports awaiting the new data packets not successfully received, which may reduce a loss of a data packet may be reduced.

Figure 9:
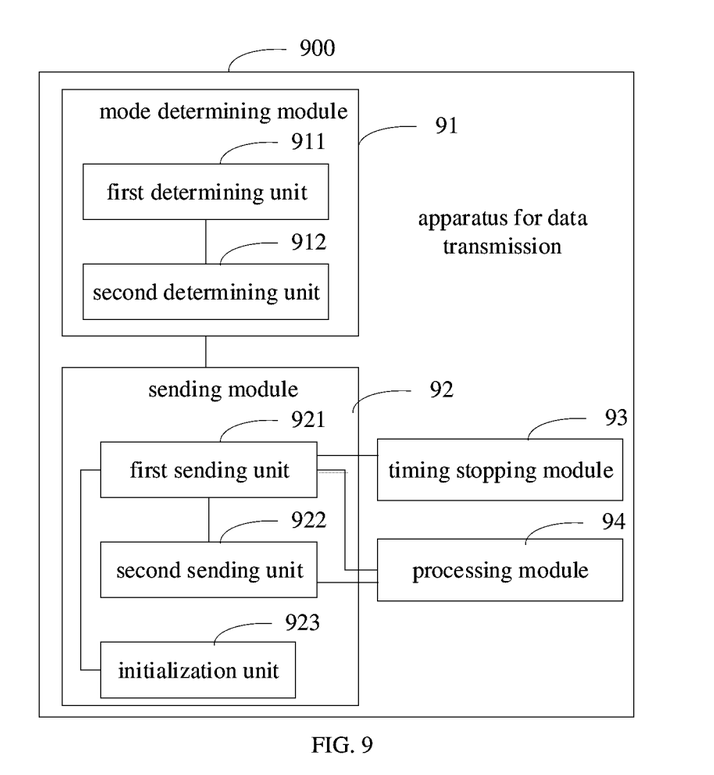
FIG. 9 is a diagram illustrating another apparatus for data transmission according to an embodiment of the present disclosure.

FIG. 9 is a diagram illustrating a structure of an apparatus for data transmission according to an embodiment of the present disclosure. The apparatus for data transmission is applicable to a PDCP entity, and the PDCP entity is associated with an RLC entity in a UM. Optionally, at least one of one or more RLC entities associated with the PDCP entity is configured in the UM. The PDCP entity may be a PDCP entity in a user equipment (UE) or a network device. The PDCP entity in the UE and the PDCP entity in the network device are peer PDCP entities.

As illustrated in FIG. 9, an apparatus 900 for data transmission may include a mode determining module 91 and a sending module 92.

The mode determining module 91 is configured to determine a target working mode of the PDCP entity.

The sending module 92 is configured to send a data packet to a high layer protocol entity in a numbering order based on the target working mode.

Optionally, the sending module 92 includes a first sending unit 921 and a second sending unit 922.

The first sending unit 921 is configured to, in response to the target working mode being a first working mode and before using newly configured PDCP configuration information, send a first data packet received from a first link to the high layer protocol entity in the numbering order.

The sending unit 922 is configured to send a second data packet received from a second link to the high layer protocol entity in the numbering order after the newly configured PDCP configuration information is used.

Optionally, the sending module 92 further includes an initialization unit 923.

The initialization unit 923 is configured to, in response to the target working mode being a second working mode and after the first data packet is sent to the high layer protocol entity in the numbering order, initialize a variable related to a reordering window.

The sending unit 922 is configured to process the second data packet by using the newly configured PDCP configuration information based on the reordering window after the initializing.

Optionally, the sending module 92 is further configured to, in response to the target working mode being a third working mode, perform an overall reordering on a first data packet and a second data packet based on respective PDCP configuration information, and send the reordered first data packet and the reordered second data packet to the high layer protocol entity in the numbering order.

The first data packet is a data packet received from a first link, the first data packet corresponds to first PDCP configuration information, and the first PDCP configuration information is previously configured PDCP configuration information.

The second data packet is a data packet received from a second link, the second data packet corresponds to second PDCP configuration information, and the second PDCP configuration information is newly configured PDCP configuration information.

Optionally, as illustrated in FIG. 9, the apparatus for data transmission further includes a timing stopping module 93.

The timing stopping module 93 is configured to stop a timer for reordering.

Optionally, the first data packet includes at least one of:
a protocol data unit (PDU) data packet cached in the PDCP entity;
a PDU data packet received by the PDCP entity from the first link before the newly configured PDCP configuration information is used; or
a PDU data packet delivered to the PDCP entity in a reestablishing process of a low layer protocol entity.

Optionally, as illustrated in FIG. 9, the apparatus for data transmission further includes a processing module 94.

The processing module 94 is configured to process the first data packet based on the first PDCP configuration information before sending the first data packet to the high layer protocol entity; and process the second data packet based on the second PDCP configuration information before sending the second data packet to the high layer protocol entity. The second PDCP configuration information is the newly configured PDCP configuration information.

Optionally, each of the first configuration information and the second PDCP configuration information includes at least an encryption algorithm and an encryption key.

Optionally, the first configuration information and the second PDCP configuration information further include at least one of:
a packet header decompression/compression configuration; or
an integrity protection algorithm and an integrity protection key.

Optionally, the decompression/compression configuration includes at least one of:
a robust header compression (ROHC)/decompression configuration; or
an ethernet header compression (EHC)/decompression configuration.

Optionally, the second PDCP configuration information further includes indication information for indicating whether a packet header decompression/compression configuration context configured in the first PDCP configuration information continues to be used.

Optionally, the processing includes a decryption processing and a reordering.

Optionally, the processing further includes at least one of: a packet header decompression/compression processing or an integrity verification processing.

Optionally, the processing module 94 is further configured to, in response to the first data packet being a decrypted data packet, stop performing the decryption processing on the first data packet.

Optionally, the processing module 94 is further configured to, in response to a packet header decompression/compression configuration being configured in the PDCP configuration information, perform the decompression/compression processing; and in response to an integrity protection algorithm and an integrity protection key being configured in the PDCP configuration information, perform the integrity verification processing.

Optionally, the first sending unit 921 is further configured to, in response to the first data packet generating a vacant data packet count in a reordering window, stop awaiting to receive a data packet corresponding to the vacant data packet count.

Optionally, the second sending unit 922 is further configured to, in response to a peer PDCP entity numbering the second data packet by using the newly configured PDCP configuration information, enable a count of the received second data packet and a count of the first data packet to be consecutive counts.

Optionally, the first sending unit 921 is configured to feed back data packet count information of the first data packet delivered to the high layer protocol entity to a peer PDCP entity.

Optionally, the mode determining module 91 includes a first determining unit 911 and a second determining unit 912.

The first determining unit 911 is configured to, in response to the PDCP entity needing to be reestablished, determine a working mode used by each RLC entity associated with the PDCP entity.

The second determining unit 912 is configured to, determine the target working mode of the PDCP entity based on at least one of a working mode used by the RLC entity or a data state feedback indication of the PDCP entity.

Optionally, the second determining unit 912 is further configured to:
- in response to only the RLC entity in the UM mode being associated with the PDCP entity, determine that the target working mode is a first working mode or a second working mode; or,
- in response to at least one of a plurality of RLC entities associated with the PDCP entity being in an acknowledged mode, determine that the target working mode is a first working mode or a third working mode; or,
- in response to the PDCP entity needing to feed back a data receiving state, determine that the target working mode is a first working mode or a third working mode; or,
- in response to at least one of a plurality of RLC entities associated with the PDCP entity receiving data in a multicast mode and at least one of a plurality of RLC entities receiving data in a unicast mode, determine that the target working mode is a first working mode or a third working mode.

Optionally, the mode determining module 91 is further configured to receive indication information and determine the target working mode based on the indication information. The indication information carries identity information of the target working mode.

In the embodiments of the present disclosure, different working modes may be configured for the PDCP entity based on different service scenarios, thus improving the flexibility of data transmission of the PDCP entity. Moreover, the reordering may be performed in each working mode. In the working mode A, data packets may be delivered to the application service more rapidly, thus reducing a delay. The working mode B has a function that supports awaiting the new data packets that are not successfully received, which may reduce a loss of a data packet.

According to embodiments of the present disclosure, a communication device and a readable storage medium are further provided in the embodiments of the present disclosure.

Figure 10:
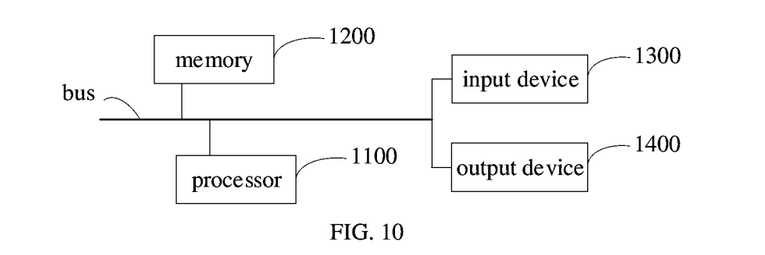
FIG. 10 is a diagram illustrating a communication device according to an embodiment of the present disclosure.

As illustrated in FIG. 10, the communication device includes: one or more processors 1100, a memory 1200, and an interface configured to connect various components, including a high-speed interface and a low-speed interface. The various components are connected to each other with different buses, and may be installed on a public main board or installed in other ways as needed. The processor may process instructions executed in the communication device, including instructions stored in or on the memory to display graphical information of the GUI on an external input/output device (such as a display device coupled to an interface). In other implementations, a plurality of processors and/or a plurality of buses may be used together with a plurality of memories if necessary. Similarly, a plurality of communication devices may be connected, and each device provides a part of necessary operations (for example, as a server array, a group of blade servers, or a multi-processor system). FIG. 10 takes one processor 1100 as an example.

The memory 1200 is the non-transitory computer-readable storage medium according to the present disclosure. The memory stores instructions executable by the at least one processor, so that the at least one processor performs the method for data transmission as described in the present disclosure. The non-transitory computer-readable storage medium of the present disclosure stores computer instructions. The computer instructions are configured so that the method for data transmission is provided in the present disclosure.

As a non-transitory computer-readable storage medium, the memory 1200 may be configured to store non-transitory software programs, non-transitory computer-executable programs and modules, such as program instructions/modules corresponding to the method for data transmission in the embodiments of the present disclosure. The processor 1100 executes various functional applications and data processing of the server by running a non-transitory software program, an instruction, and a module stored in the memory 1200, that is, the method for data transmission in the above method embodiment is implemented.

The memory 1200 may include a program storage area and a data storage area, in which the program storage area may store operation systems and application programs needed by at least one function; and the data storage area may store data created based on the use of a positioning communication device, etc. In addition, the memory 1200 may include a high-speed random access memory, and may also include a non-transitory memory, such as at least one magnetic disk storage device, a flash memory device, or other non-transitory solid-state storage devices. In some embodiments, the memory 1200 optionally includes a memory set remotely relative to the processor 1100 that may be connected to the positioning communication device via a network. The example of the above networks includes but not limited to an Internet, an enterprise intranet, a local area network, a mobile communication network and their combination.

The communication device may further include: an input device 1300 and an output device 1400. The processor 1100, the memory 1200, the input device 1300, and the output device 1400 may be connected through a bus or in other ways. FIG. 10 takes connection through a bus as an example.

The input device 1300 may receive input digital or character information, and generate a key signal input related to user settings and function control of the positioning communication device, such as a touch screen, a keypad, a mouse, a track pad, a touch pad, an indicating rod, one or more mouse buttons, a trackball, a joystick and other input devices. The output device 1400 may include a display device, an auxiliary lighting device (for example, a LED) and a tactile feedback device (for example, a vibration motor), etc. The display device may include but not limited to a liquid crystal display (LCD), a light emitting diode (LED) display and a plasma display. In some implementations, the display device may be a touch screen.

Various implementation modes of the systems and technologies described herein may be implemented in a digital electronic circuit system, an integrated circuit system, a dedicated application specific integrated circuit (ASIC), a computer hardware, a firmware, a software, and/or their combinations. The various implementation modes may include: being implemented in one or more computer programs, and the one or more computer programs may be executed and/or interpreted on a programmable system including at least one programmable processor. The programmable processor may be a dedicated or a general-purpose programmable processor that may receive data and instructions from a storage system, at least one input device, and at least one output device, and transmit the data and instructions to the storage system, the at least one input device, and the at least one output device.

The computer programs (also called as programs, software, software applications, or codes) include machine instructions of the programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for the programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for the programmable processor.

In order to provide interaction with the user, the systems and technologies described here may be implemented on a computer, and the computer has: a display device for displaying information to the user (for example, a cathode ray tube (CRT) or a LCD monitor); and a keyboard and a pointing device (for example, a mouse or a trackball) through which the user may provide input to the computer. Other types of devices may further be configured to provide interaction with the user; for example, the feedback provided to the user may be any form of sensory feedback (for example, a visual feedback, an auditory feedback, or a tactile feedback); and inputs from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other.

Those skilled in the art may understand that all or part of steps in the above embodiments may be implemented by a program to instruct relevant hardware, in which the program may be stored in a computer readable storage medium including one or combination of steps in the embodiments of the method when executing.

In addition, functional units in the embodiments of the present disclosure may be integrated in a processing module, or may be physically existed separately, or two or more units may be integrated in a module. The above integrated module may be implemented in the form of a hardware or in the form of a software functional module. The integrated module may be stored in a computer readable storage medium if it is implemented in the form of the software functional module and it is sold and used as an independent product.

The foregoing storage medium may be a read-only memory, a magnetic disk or a compact disc, etc.

The foregoing are preferred embodiments of the present disclosure. It should be noted that, for those skilled in the art, several improvements and modifications may be made without departing from the principles of the present disclosure, and these improvements and modifications are also considered to be within the protection scope of the present disclosure.

What is claimed is:

1. A method for data transmission, performed by a packet data convergence protocol (PDCP) entity, wherein the PDCP entity is associated with a radio link control (RLC) entity in an unacknowledged mode (UM), the method comprising:
    determining a target working mode of the PDCP entity;
    sending a data packet to a high layer protocol entity in a numbering order based on the target working mode;
    in response to the target working mode being a first working mode and before using newly configured PDCP configuration information, sending a first data packet received from a first link to the high layer protocol entity in the numbering order; and after the newly configured PDCP configuration information is used, sending a second data packet received from a second link to the high layer protocol entity in the numbering order; and
    in response to the target working mode being a second working mode and after the first data packet is sent to the high layer protocol entity in the numbering order, initializing a variable related to a reordering window; and processing the second data packet by using the newly configured PDCP configuration information based on the reordering window after the initializing.

2. The method according to claim 1, further comprising:
    in response to the target working mode being a third working mode, performing an overall reordering on the first data packet and the second data packet based on respective PDCP configuration information, and sending the reordered first data packet and the reordered second data packet to the high layer protocol entity in the numbering order;
    wherein the first data packet corresponds to first PDCP configuration information, and the first PDCP configuration information is previously configured PDCP configuration information; and
    the second data packet corresponds to second PDCP configuration information, and the second PDCP configuration information is newly configured PDCP configuration information.

3. The method according to claim 1, further comprising: stopping a timer for reordering.

4. The method according to claim 1, wherein the first data packet comprises at least one of:
   a protocol data unit (PDU) data packet cached in the PDCP entity;
   a PDU data packet received by the PDCP entity from the first link before the newly configured PDCP configuration information is used; or
   a PDU data packet delivered to the PDCP entity in a reestablishing process of a low layer protocol entity.

5. The method according to claim 1, further comprising:
   processing the first data packet based on first PDCP configuration information before sending the first data packet to the high layer protocol entity; and
   processing the second data packet based on second PDCP configuration information before sending the second data packet to the high layer protocol entity, wherein the second PDCP configuration information is the newly configured PDCP configuration information.

6. The method according to claim 5, wherein each of the first PDCP configuration information and the second PDCP configuration information comprises at least an encryption algorithm and an encryption key.

7. The method according to claim 6, wherein the first PDCP configuration information and the second PDCP configuration information further comprise at least one of:
   a packet header decompression/compression configuration; or
   an integrity protection algorithm and an integrity protection key.

8. The method according to claim 7, wherein the packet header decompression/compression configuration comprises at least one of:
   a robust header compression (ROHC)/decompression configuration; or
   an ethernet header compression (EHC)/decompression configuration,
   wherein the second PDCP configuration information further comprises indication information for indicating whether a packet header decompression/compression configuration context configured in the first PDCP configuration information continues to be used.

9. The method according to claim 5, wherein the processing comprises a decryption processing and a reordering.

10. The method according to claim 9, wherein the processing further comprises at least one of: a packet header decompression/compression processing or an integrity verification processing.

11. The method according to claim 10, further comprising:
    in response to a packet header decompression/compression configuration being configured in the PDCP configuration information, the processing comprising the decompression/compression processing; and
    in response to an integrity protection algorithm and an integrity protection key being configured in the PDCP configuration information, the processing comprising the integrity verification processing.

12. The method according to claim 9, further comprising:
    in response to the first data packet being a decrypted data packet, stopping performing the decryption processing on the first data packet.

13. The method according to claim 1, further comprising:
    in response to the first data packet generating a vacant data packet count in a reordering window, stopping awaiting to receive a data packet corresponding to the vacant data packet count;
    in response to a peer PDCP entity numbering the second data packet by using the newly configured PDCP configuration information, enabling a count of the received second data packet and a count of the first data packet to be consecutive counts; and
    feeding back data packet count information of the first data packet delivered to the high layer protocol entity to a peer PDCP entity.

14. The method according to claim 1, wherein determining the target working mode of the PDCP entity comprises:
    in response to the PDCP entity needing to be reestablished, determining a working mode used by each RLC entity associated with the PDCP entity; and
    determining the target working mode of the PDCP entity based on at least one of a working mode used by the RLC entity or a data state feedback indication of the PDCP entity.

15. The method according to claim 14, wherein determining the target working mode of the PDCP entity based on at least one of the working mode used by the RLC entity or the data state feedback indication of the PDCP entity comprises one of:
    in response to only the RLC entity in the UM mode being associated with the PDCP entity, determining that the target working mode is the first working mode or the second working mode;
    in response to at least one of a plurality of RLC entities associated with the PDCP entity being in an acknowledged mode, determining that the target working mode is the first working mode or a third working mode;
    in response to the PDCP entity needing to feed back a data receiving state, determining that the target working mode is the first working mode or the third working mode; or
    in response to at least one of a plurality of RLC entities associated with the PDCP entity receiving data in a multicast mode and at least one of a plurality of RLC entities receiving data in a unicast mode, determining that the target working mode is the first working mode or the third working mode.

16. The method according to claim 15, wherein determining the target working mode of the PDCP entity comprises:
    receiving indication information, wherein the indication information carries identity information of the target working mode; and
    determining the target working mode based on the indication information.

17. A communication device, comprising:
    at least one processor; and
    a memory communicatively connected to the at least one processor and storing instructions executable by the at least one processor,
    wherein the at least one processor is configured to:
    determine a target working mode of a packet data convergence protocol (PDCP) entity;
    send a data packet to a high layer protocol entity in a numbering order based on the target working mode;
    in response to the target working mode being a first working mode and before using newly configured PDCP configuration information, send a first data packet received from a first link to the high layer protocol entity in the numbering order; and after the newly configured PDCP configuration information is used, send a second data packet received from a second link to the high layer protocol entity in the numbering order; and in response to the target working mode being a second working mode and after the first data packet is sent to the high layer protocol entity in the numbering order, initialize a variable related to a reordering window; and process the second data packet by using the newly configured PDCP configuration information based on the reordering window after the initializing.

18. A non-transitory computer-readable storage medium storing instructions that, when executed by a processor, cause a packet data convergence protocol (PDCP) entity to perform a method for data transmission, wherein the PDCP entity is associated with a radio link control (RLC) entity in an unacknowledged mode (UM), the method comprising:

determining a target working mode of the PDCP entity;

sending a data packet to a high layer protocol entity in a numbering order based on the target working mode;

in response to the target working mode being a first working mode and before using newly configured PDCP configuration information, sending a first data packet received from a first link to the high layer protocol entity in the numbering order; and after the newly configured PDCP configuration information is used, sending a second data packet received from a second link to the high layer protocol entity in the numbering order; and in response to the target working mode being a second working mode and after the first data packet is sent to the high layer protocol entity in the numbering order, initializing a variable related to a reordering window; and processing the second data packet by using the newly configured PDCP configuration information based on the reordering window after the initializing.

* * * * *